United States Patent [19]

Kawaguchi

[11] 4,193,086
[45] Mar. 11, 1980

[54] CONVERGENCE DETECTING DEVICE FOR COLOR PICTURE TUBE

[75] Inventor: Ikuo Kawaguchi, Yokohama, Japan

[73] Assignee: Hitachi, Ltd., Japan

[21] Appl. No.: 871,253

[22] Filed: Jan. 23, 1978

[30] Foreign Application Priority Data

Jan. 24, 1977 [JP] Japan .................................. 52-5894

[51] Int. Cl.² .............................................. H04N 9/62
[52] U.S. Cl. ........................................ 358/10; 358/65
[58] Field of Search ................ 358/10, 64, 65, 101, 358/106, 107, 181, 105; 315/13 C, 368; 356/157, 158, 162, 167; 250/578; 324/20 CR; 313/412

[56] References Cited

U.S. PATENT DOCUMENTS

| 2,578,298 | 12/1951 | Goldsmith | 358/92 |
| 4,115,802 | 9/1978 | Kramer | 358/106 |

FOREIGN PATENT DOCUMENTS

51-80118 7/1976 Japan ........................................ 358/10

*Primary Examiner*—John C. Martin

*Attorney, Agent, or Firm*—Craig and Antonelli

[57] ABSTRACT

A pattern signal for sequentially displaying crisscross patterns of three primary colors of red, green and blue is supplied to a color picture tube. Two television cameras pick up the pattern images displayed on the color picture tube through a 1:1 half mirror. The line scanning directions of the first and second television cameras are horizontal and vertical respectively with respect to the CRT display screen. The aspect ratio of the first television camera is selected to be equal to that of the CRT display screen, and the aspect ratio of the second television camera is selected to be equal to the reciprocal of that of the CRT display screen. The image output signals of these two television cameras are selectively supplied to an image processing circuit by a change-over unit. In this image processing circuit, a counter counts the time-related positions of peak values appearing within a specified line scanning period in the image signals supplied through the change-over unit. The degree of convergence is detected by detecting the differences between the time-related peak value positions in the red, green and blue patterns.

5 Claims, 6 Drawing Figures

CONVERGENCE DETECTING DEVICE FOR COLOR PICTURE TUBE

This invention relates to a convergence detecting device which can be used for the convergence alignment of a color picture tube or cathode-ray tube in a color television receiver.

In a color picture tube of the shadow mask type incorporated in a color television receiver, three electron beams emitted from three electron guns providing scanning beams for the three primary colors of red, green and blue respectively must pass through the same aperture of the shadow mask to excite the phosphor dots of red, green and blue on the phosphor screen at the same time. Failure of passage of the three electron beams through the same aperture of the shadow mask at the same time results in color misalignment. In color picture tubes of this type, the three electron guns are generally arranged to be slightly inclined to the tube axis so that the three electron beams can be focused at the central area of the shadow mask. However, it is generally not possible to make the color picture tubes of the shadow mask type with the desired convergence performance due to various factors. The major factors are such that the color picture tubes are manufactured with fluctuating or non-uniform convergence performance, and the distance between the centre of deflection and the shadow mask of the color picture tubes differs depending on the deflection angle. In order to provide sastisfactory convergence performance, convergence alignment is done after the manufacture by a convergence aligning device which is disclosed in, for example, U.S. Pat. No. 3,725,831 entitled "MAGNETIC BEAM ADJUSTING ARRANGEMENTS" invented by Robert Lloyd Barbin and assigned to RCA Corporation.

Horizontal lines 1 and vertical lines 2 in a pattern as shown in FIG. 1 will be observed as white lines on the phosphor screen of a color picture tube of the shadow mask type in a color television receiver when the convergence alignment is best. However, such a pattern will be displayed as, for example, shown in FIG. 2, when the pattern is produced on a color picture tube of a color television receiver in which the convergence alignment is not sufficiently performed. In the case of the pattern shown in FIG. 2, the lines 1 and 2, each of which should primarily be observed as a single white line, are separated into a red line 3, a green line 4 and a blue line 5 in the peripheral zone of the phosphor screen. The common practice for the convergence alignment is such that the operator manipulates the aforementioned convergence aligning device while observing the phosphor screen until the lines 3, 4 and 5 align to provide the white lines 1 and 2. However, due to the fact that the measurement of color misalignment for the purpose of convergence alignment is based upon the personal visual decision of the operator, this convergence alignment tends to become non-uniform, and the necessity for checking the luminant state of one phosphor dot after another by the eyes of the operator during the measurement leads to the eyestrain of the operator. Further, the measurement of the color misalignment over the entire area of the phosphor screen consumes a great length of time.

In an effort to obviate the above defects, a convergence detecting device has been invented by engineers including the inventor of the present application and is disclosed in Japanese Patent Application Kokai (Laid-Open) No. 80118/76, in which individual primary color patterns of red, green and blue as shown in FIG. 2 are displayed on the CRT display screen of a color television receiver, and the time-related positions of the peak values appearing in the pattern image signals produced by a monochromatic television camera picking up the individual pattern images are detected to detect the amounts of color misalignment as the differences between the time-related positions of the peak values in the individual primary color patterns.

The principle of color misalignment detection disclosed in the cited patent application will now be described for a better understanding of the present invention. Referring to FIG. 3, a vertical line 2 is shown displayed on the centre of the phosphor screen of a color picture tube of a color television receiver in which the convergence alignment is not performed sufficiently. In such a case, this vertical line 2 is separated into a red line 3, a green line 4 and a blue line 5 at the upper and lower end edges of the screen as shown in FIG. 3. A series of image signals are obtained when the screen is scanned in a horizontal direction by a monochromatic television camera. Image signals appearing in one horizontal scanning period along a horizontal line 6 will be as shown in FIG. 4, in which waveforms a, b and c represent the image signals obtained as a result of the scanning of the corresponding red, green and blue color portions of the vertical line 2. Since the convergence alignment is not satisfactory in FIG. 3, the periods of time $t_R$, $t_G$ and $t_B$ from the position of a horizontal synchronizing signal 7 to the positions of respective peaks 8, 9 and 10 are not equal. The device includes a time counting unit consisting of a time counting pulse generator and a pulse counter. The pulse counter starts to count the number of pulses generated by the pulse generator at the time of appearance of a specific horizontal synchronizing signal 7 and ceases to count the number of pulses at the times of appearance of each of the peaks 8, 9 and 10. Therefore, the counts of the pulse counter indicate the periods of time $t_R$, $t_G$ and $t_B$.

In regard to the detection of color misalignment in a direction orthogonal with respect to the horizontal line 6, the aforementioned patent application describes merely that the color picture tube under test or the television camera may be rotated through an angle of 90°. However, whether the color picture tube or the television camera is rotated, mechanical vibration will be imparted to the color picture tube or the television camera, and the mechanical shock will cause breakage of the tube or camera or dislocation of the deflection yoke assembly. It is therefore undesirable to detect the convergence in both the vertical direction and the horizontal direction by a single television camera. Further, since the aspect ratio (the ratio of the length of line scanning to the length of screen scanning) is generally set at 4:3 in the CRT display screen of a television receiver, the left-hand and right-hand portions of a pattern displayed on the CRT display screen will not be accommodated in the sight of the image pickup area of the television camera when the television camera is rotated through 90° in the state in which the distance between the color picture tube and the television camera is set at the value which provides the highest sensitivity of detection for the vertical convergence misalignment, that is, at the distance at which the entire area of the CRT display screen can be accommodated in the sight of the image pickup area of the television camera. Thus, in order to detect the horizontal convergence misalignment over the entire area of the CRT display screen, the distance between the color picture tube and the television camera must be made greater than when the vertical convergence misalignment is detected. When the distance between the color picture tube and the television camera is set at the value suitable for the horizontal convergence misalignment detection, a blank space is left in the image pickup area of the television camera, and the entire image pickup area of the television camera cannot be fully effectively utilized. In other words, there occurs an undesirable reduction in the detection accuracy provided by dividing the actual horizontal distance of the CRT display screen by the length of time required for the television camera to make horizontal line scanning along the above distance.

Further, in the aforementioned detection method, the color picture tube and/or the television camera are rotated for the purpose of detection of convergence misalignment. This method is defective in that its detection efficiency is relatively low due to the time required for rotating the color picture tube and/or the television camera, and the tendency toward dislocation of the relative positions of the color picture tube and the television camera due to mechanical vibration gives rise to an undesirable detection error.

It is therefore a primary object of the present invention to provide a novel and improved convergence detecting device for a color picture tube, which can detect convergence misalignment with a high detection sensitivity.

Another object of the present invention is to provide a convergence detecting device for a color picture tube, which can operate with a high detection efficiency.

The convergence detecting device according to the present invention which attains the above objects comprises first image pickup means for scanning the display screen of a color picture tube of a color television receiver in its line scanning direction to pick up a pattern image displayed on the CRT display screen, second image pickup means for scanning the CRT display screen in a direction orthogonal with respect to the scanning direction of the first image pickup means to pick up the pattern image displayed on the CRT display screen, optical means for simultaneously directing light from the CRT display screen toward the first and second image pickup means, and selective change-over means for selectively permitting passage of the image output signals of the first and second image pickup means, whereby the image signals used for the detection of convergence misalignment can be efficiently derived.

Preferably, the aspect ratio of the image pickup area of the first image pickup means in the present invention is selected to be equal to that of the display screen of the color picture tube, and the aspect ratio of the image pickup area of the second image pickup means is selected to be the reciprocal of that of the display screen of the color picture tube.

The present invention will become more apparent from the following description taken with reference to the accompanying drawings, in which.

Figure 5:
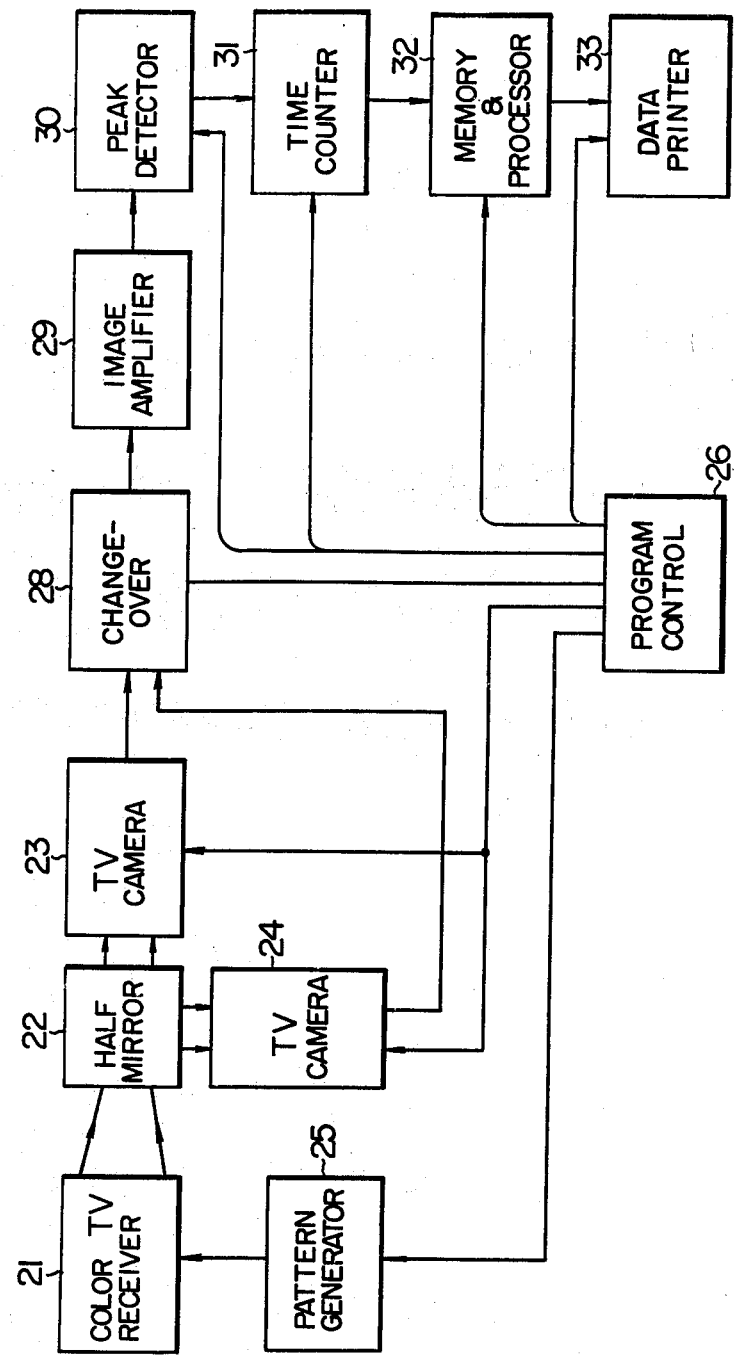
FIG. 5 is a block diagram of an embodiment of a convergence detecting device for a color picture tube according to the present invention.

Referring to FIG. 5, the reference numeral 21 designates a color television receiver in which its color picture tube or CRT is not yet subjected to convergence alignment. Light from the CRT display screen of the color television receiver 21 is incident upon a half mirror 22 having a transmissivity and a reflectivity of 50% respectively to be projected onto a horizontal convergence misalignment detecting camera 23 and a vertical convergence misalignment detecting camera 24. The aspect ratio of the image pickup area of the horizontal convergence misalignment detecting camera 23 is selected to be equal to that of the CRT display screen of the color television receiver 21, and the optical distance between the color television receiver 21 and the horizontal convergence misalignment detecting camera 23 is so set that the entire area of the CRT display screen can be accommodated in the sight of the entire image pickup area of the camera 23. On the other hand, the aspect ratio of the image pickup area of the vertical convergence misalignment detecting camera 24 is selected to be equal to the reciprocal of that of the CRT display screen of the color television receiver 21, and the optical distance between the color television receiver 21 and the vertical convergence misalignment detecting camera 24 is so set that the entire area of the CRT display screen can be accommodated in the sight of the entire image pickup area of the camera 24. Thus, a conventional television camera can be used as the horizontal convergence misalignment detecting camera 23, but a modified conventional television camera having an altered maximum deflection angle must be used as the vertical convergence misalignment detecting camera 24. The image pickup range of the horizontal convergence misalignment detecting camera 23 in one line period of the image signal output of the camera 23 is equal to the horizontal length of the CRT display screen, while the image pickup range of the vertical convergence misalignment detecting camera 24 in one line period of the image signal output of the camera 24 is equal to the vertical length of the CRT display screen. Since the vertical length of the CRT display screen is shorter than the horizontal length, the detection accuracy of the vertical convergence misalignment detecting camera 24 is better than that of the horizontal convergence misalignment detecting camera 23. Thus, the aspect ratio of the vertical convergence misalignment detecting camera 24 is selected to differ from that of conventional ones so as to increase its detection accuracy.

Figure 1:
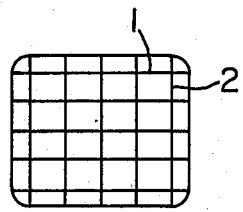
FIG. 1 is a schematic view showing a pattern consisting of white vertical and horizontal lines when it is displayed on a color picture tube having a satisfactory convergence characteristic.
Figure 2:
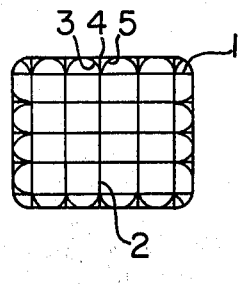
FIG. 2 is a view similar to FIG. 1, but showing such a pattern when it is displayed on a color picture tube which is not subjected to convergence alignment.
Figure 3:
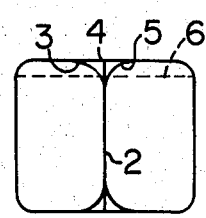
FIG. 3 is a schematic view showing a pattern including a single white vertical line when it is displayed on a color picture tube which is not subjected to convergence alignment.
Figure 4:
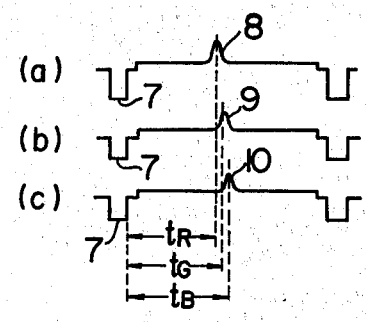
FIG. 4 shows waveforms of image signals obtained when the displayed pattern image shown in FIG. 3 is picked up by a monochromatic television camera.
Figure 6:
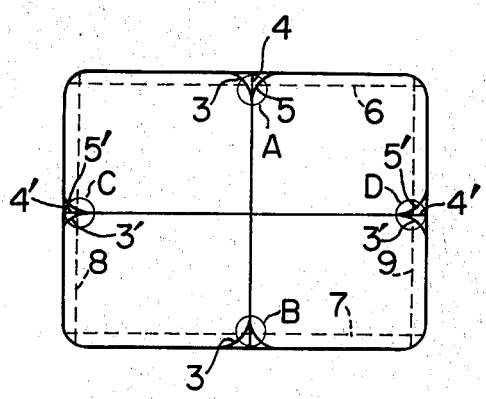
FIG. 6 is a schematic view showing an example of a pattern used for the color misalignment detection by the convergence detecting device shown in FIG. 5.

A pattern generator 25 supplies a pattern signal to the color television receiver 21 so that a crisscross pattern as shown in FIG. 6 can be displayed on the CRT display screen of the color television receiver 21 whose color picture tube is not yet subjected to convergence alignment. In response to the application of a control signal from a program control unit 26, this pattern generator 25 supplies such a pattern signal to the color television receiver 21 so that primary color lines of red, green and blue are sequentially displayed on the CRT display screen. When such primary color lines are displayed on the CRT display screen of a color television receiver having a satisfactory convergence characteristic, such lines are displayed on the same portion of the phosphor screen to be observed as white lines. The output signal of the pattern generator 25 is adjusted so that the brightness of each individual primary color line is suitable for the image pickup operation of the detecting cameras 23 and 24. The outputs of the horizontal and vertical convergence misalignment detecting cameras 23 and 24 are connected to a selective change-over unit 28 which supplies selectively the image output signals of the cameras 23 and 24 to an image amplifier 29 under control of a control signal applied from the program control unit 26. The output of the image amplifier 29 is connected to a peak detector 30 which detects the peak value in each of the image output signals of the detecting cameras 23 and 24. The output of the peak detector 30 is connected to a time counter 31 which counts the period of time between the peak value and a horizontal synchronizing signal present immediately before the appearance of this peak value in each of the image output signals of the detecting cameras 23 and 24. The output of the time counter 31 is connected to a memory and processing circuit 32 consisting of a memory storing the output signal of the time counter 31, and an information processing circuit making necessary computation and processing on the contents of the memory. In this memory and processing circuit 32, time-related differences between the red and green lines and between the green and blue lines at selected detection points on the CRT display screen are converted into a length data output signal. This output signal is supplied to, for example, a data printer 33 which provides a printed record of detected data.

In operation, the pattern signal representing the crisscross patterns of the three primary colors of red, green and blue is supplied from the pattern generator 25 to the color television receiver 21 under control of a control signal applied from the program control unit 26 so as to sequentially display such crisscross patterns of red, green and blue on the CRT display screen of the color television receiver 21. While the individual primary color patterns are being sequentially displayed on the CRT display screen, information of all the positions of the individual primary color lines at predetermined detection portions on the CRT display screen are stored in the memory of the memory and processing circuit 32. These predetermined detection portions are, for example, the middle portions A to D of the four sides of the CRT display screen as shown in FIG. 6.

By selecting the above four portions as the predetermined detection portions and eliminating convergence misalignment at these four selected detection portions, horizontal and vertical convergence misalignment throughout the CRT display screen can be reduced to a level which is allowable for practical use. In the final test, color misalignment at nine portions including the aforementioned four portions is detected to ensure a practically satisfactory convergence characteristic.

The manner of detection of convergence misalignment will be described with reference to the case in which the crisscross pattern of red color is first displayed on the CRT display screen. The change-over unit 28 is now changed over to the position at which it supplies the output signal of the horizontal convergence misalignment detecting camera 23 to the image amplifier 29. The peak detector 30 is operable only when a control signal is supplied thereto from the program control unit 26. This control signal is in phase with the deflection signals in the detecting cameras 23 and 24, and the program control unit 26 generates this control signal when the horizontal convergence misalignment detecting camera 23 scans the horizontal lines 6 and 7 shown in FIG. 6. In response to the application of this control signal, the time counter 31 starts to count the time. Therefore, information of the horizontal positions of the red line 3 in the detection portions A and B in FIG. 6 are stored in the memory of the memory and processing circuit 32. The change-over unit 28 is then changed over to the next position in response to the application of a control signal from the program control unit 26 so as to now supply the output signal of the vertical convergence misalignment detecting camera 24 to the image amplifier 29. The program control unit 26 supplies this control signal to the peak detector 30 and time counter 31 when the vertical convergence misalignment detecting camera 24 scans the vertical line 8 or 9 shown in FIG. 6, and information of the vertical positions of the red line 3' in the detection portions C and D in FIG. 6 are stored in the memory of the memory and processing circuit 32. Upon completion of storage of all the information of the positions of the red lines 3 and 3' in the detection portions A to D, the pattern generator 25 is controlled to display now the criss-cross pattern of green color on the CRT display screen, and all the information of the positions of the green lines in the detection portions A to D are stored in the memory of the memory and processing circuit 32. Similarly, all the information of the positions of the blue lines in the detection portions A to D are stored in the memory of the memory and processing circuit 32. Upon completion of storage of all these information in the memory, the information processing circuit computes the amounts of color misalignment in the detection portions A to D, and its output signal representing the result of computation is supplied to the data printer 33. Suitability of the convergence chracteristic can be judged on the basis of the result of computation on the amounts of color misalignment in the memory and processing circuit 32. Further, on the basis of the result of computation, the convergence aligning device incorporated in the color television receiver is suitably actuated so as to provide the desired satisfactory convergence characteristic. An automatic control unit capable of imparting mechanical displacement to the convergence aligning device depending on the output signal of the memory and processing circuit 32 may be provided so as to automatically attain the desired convergence alignment. The mechanical displacement herein referred to means, for example, that rotating movement is imparted to the rotatable magnet rings disclosed in aforementioned U.S. Pat. No. 3,725,831. The pattern generator 25 may be constructed to generate such a pattern signal that the red lines 3, 3' green lines 4, 4' and blue lines 5, 5' appear at the detection portions A to D only of the CRT display screen.

A length of time of about 5 to 6 minutes is generally required when the visual detection by the operator is resorted to for the measurement of the convergence characteristic over the entire area of the CRT display screen. In sharp contrast, the length of time required for the measurement of this kind can be reduced to about 1 second when the two detecting cameras are used and their image output signals are electrically processed according to the embodiment of the present invention. The alteration of the aspect ratio of the vertical convergence misalignment detecting camera is advantageous in that the entire image pickup area of this camera can be fully effectively utilized, thereby improving the detection sensitivity of the vertical convergence misalignment detecting camera instead of reducing the detection sensitivity thereof.

What is claimed is:

1. A convergence detecting device for a color picture tube which is provided with beam deflection adjusting means and which is to be subjected to convergence alignment, comprising:
   (a) pattern display signal generating means for supplying to said color picture tube a pattern display signal for displaying at least one red line, green line and blue line or portions thereof in each of the horizontal and vertical directions on a CRT display screen of said color picture tube, said display signal being capable of displaying said red, green and blue lines or portions thereof at the same position on the CRT display screen when supplied to a color picture tube having been subjected normally to convergence alignment;
   (b) first image pickup means for picking up an image from the CRT display screen by a line scan having a direction which is in accordance with the horizontal direction of the CRT display screen to produce image output signals representing the horizontal positions of the vertical lines displayed on the CRT display screen;
   (c) second image pickup means for picking up an image from the CRT display screen by a line scan having a direction which is in accordance with the vertical direction of the CRT display screen to produce image output signals representing the vertical positions of the horizontal lines displayed on the CRT display screen;
   (d) light-dividing optical means for directing light from the CRT display screen toward said first and second image pickup means;
   (e) selective change-over means for selectively permitting passage of either said image output signals of said first image pickup means or said image output signals of said second image pickup means;
   (f) line period specifying means for specifying a predetermined line period of said image output signals selectively appearing from said change-over means; and
   (g) single detecting means for detecting the differences between the displayed positions represented by said image output signals corresponding to said red, green and blue lines,
   whereby misalignment of the positions of said red, green and blue lines in said predetermined line period in both the horizontal and vertical directions can be detected by said single detecting means connected to said first and second image pickup means through said change-over means.

2. A convergence detecting device as claimed in claim 1, wherein the aspect ratio of the image pickup area of said first image pickup means is selected to be equal to that of the CRT display screen, and the aspect ratio of the image pickup area of said second image pickup means is selected to be equal to the reciprocal of that of the CRT display screen.

3. A convergence detecting device as claimed in claim 1, wherein said optical means includes a half mirror which permits passage of a portion of the light from the CRT display screen toward one of said image pickup means and reflects another portion of the light toward the other said image pickup means.

4. A convergence detecting device for a color picture tube which is provided with beam deflection adjusting means and which is to be subjected to convergence alignment, comprising:
   (a) pattern display signal generating means for supplying to said color picture tube a pattern display signal for displaying at least one red line, green line and blue line or portions thereof in each of the horizontal and vertical directions on a CRT display screen of said color picture tube, said display signal being capable of displaying said red, green and blue lines or portions thereof at the same position on the CRT display screen when supplied to a color picture tube having been subjected normally to convergence alignment;
   (b) first image pickup means for picking up an image from the CRT display screen by a line scan having a direction which is in accordance with the horizontal direction of the CRT display screen to produce image output signals representing the horizontal positions of the vertical lines displayed on the CRT display screen;
   (c) line period specifying means for specifying a predetermined line period of said image output signals; and
   (d) single detecting means for detecting the differences between the displayed positions represented by said image output signals corresponding to said red, green and blue lines,
   wherein the improvement comprises:
   (1) second image pickup means for picking up an image from the CRT display screen by a line scan having a direction which is in accordance with the vertical direction of the CRT display screen to produce image output signals representing the vertical positions of the horizontal lines displayed on the CRT display screen;
   (2) light-dividing optical means for directing light from the CRT display screen toward said first and second image pickup means; and
   (3) selective change-over means for selectively permitting passage of either said image output signals of said first image pickup means or said image output signals of said second image pickup means,
   whereby said image output signals of said first and second image pickup means can be selectively supplied to said single detecting means by the action of said selective change-over means alone so as to be detected by said detecting means.

5. The improvement as claimed in claim 4, wherein the aspect ratio of the image pickup area of said first image pickup means is selected to be equal to that of the CRT display screen, and the aspect ratio of the image pickup area of said second image pickup means is selected to be equal to the reciprocal of that of the CRT display screen.

* * * * *